(12) United States Patent
Tamada

(10) Patent No.: US 6,515,956 B2
(45) Date of Patent: Feb. 4, 2003

(54) OPTICAL RECORDING MEDIUM, REPRODUCING APPARATUS, AND RECORDING AND REPRODUCING APPARATUS THEREFOR

(75) Inventor: Sakuya Tamada, Tokyo (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 09/859,055

(22) Filed: May 16, 2001

(65) Prior Publication Data

US 2002/0009037 A1 Jan. 24, 2002

(30) Foreign Application Priority Data

May 16, 2000 (JP) ........................................ 2000-143821

(51) Int. Cl.$^7$ ................................................ G11B 7/00
(52) U.S. Cl. ................... 369/112.17; 369/284; 369/288
(58) Field of Search ............................ 369/108, 112.16, 369/112.29, 118, 112.17, 275.1, 275.4, 275.5, 283, 284, 286, 288; 430/139, 269, 270.11, 270.14, 321

(56) References Cited

U.S. PATENT DOCUMENTS 5,671,211 A * 9/1997 Akashi et al. ............ 369/275.1
6,009,065 A * 12/1999 Glushko et al. .......... 369/112.22
6,291,132 B1 * 9/2001 Glushko et al. .......... 369/275.3

* cited by examiner

Primary Examiner—Paul W. Huber
(74) Attorney, Agent, or Firm—Sonnenschein, Nath & Rosenthal

(57) ABSTRACT

An optical recording medium having a laminated structure portion(4) including a light-emission layer(3) and a recording layer(2). The light-emission layer(3) is made of a light-emission material excited by reproducing laser light to emit fluorescent light, and the recording layer(2) is made of a material in which at least a refractive index or an absorption coefficient can be changed relative to light emitted from the light-emission layer by recording laser light. The recording layer(2) is disposed to be closer to a side into which reproducing laser light is introduced than the light-emission layer(3). Then, recorded information recorded on the recording layer by the change of the refractive index or the absorption coefficient is read out from the recording layer as the change of intensity of light emitted from the light-emission layer(3) when it is irradiated with reproducing laser light. This optical recording medium can realize an optical memory which can generate a reproduced signal with a high S/N.

15 Claims, 7 Drawing Sheets

OPTICAL RECORDING MEDIUM, REPRODUCING APPARATUS, AND RECORDING AND REPRODUCING APPARATUS THEREFOR

RELATED APPLICATION DATA

The present application claims priority to Japanese Application No. P2000-143821 filed May 16, 2000, which application is incorporated herein by reference to the extent permitted by law.

BACKGROUND OF THE INVENTION

The present invention relates to an optical information-recording medium such as an optical disk, a reproducing apparatus and a recording and reproducing apparatus therefor.

An optical information recording system has lots of advantages such as to cope with various types of memories such as a read-only memory, a write-once memory and a rewritable memory, to record and reproduce information in a non-contact fashion, to easily remove an optical recording medium from a recording and reproducing apparatus and to carry an optical recording medium (optical recording medium is removable) and to execute random-access and to carry out recording and reproducing with a high recording density. Further, the optical information recording system is capable of realizing an inexpensive file of a large storage capacity, and therefore can be used in a wide field ranging from an industrial use to a commercial use.

Of the above types of memories, as optical memories of ROM (read-only memory), there have already been widely used various types of optical memories such as a digital audio disc (so-called compact disc (CD)), an optical video disk (so-called laser disk (LD)) and CD-ROM.

In these read-only optical memories, information recording pits are generally recorded on a transparent substrate as concave and convex shapes or portions in which optical constants are changed in the form of the pattern corresponding to this information signal Then, a reflecting layer made of a metal material such as Al (aluminum) is deposited on this recording pattern, Reproducing light such as laser light is irradiated on such an optical recording medium from the side of the transparent substrate and the existence of the pits within the spot of reproducing light is identified by detecting the pits as an intensity of reflected light, whereby information is read out, reproduced from the optical recording medium Then, in the above read-only optical memory, in order to maintain a recording capacity which is capable of coping with the advance of the technologies such as a digital VTR (digital video tape recorder) and a high-vision television (HDTV (high definition television)), there is an increasing demand for further improving a recording density of the read-only optical memory.

On the other hand, from a standpoint of improving operability, there is an increasing demand for miniaturizing an optical memory, ive., an optical recording medium From the above demand, it is also desired to further increase a recording density of an optical recording medium.

As a means for increasing the recording density of the optical recording medium, first, it is considered to micro-miniaturize the recording pattern, i e., to reduce the cycle of the above pit.

However, since the reproducing optical system has a diffraction limit $\lambda/(2N.A.)$ ($\lambda$ is the wavelength of reproducing light and N. A. is the numerical aperture of the objective lens of the optical system) in which the diameter of the beam spot cannot be reduced anymore, if the cycle of the pit is reduced too much, then there occurs the situation under which a plurality of pits are overlapping with each other within the spot of the reproducing light. There is then the disadvantage that an information signal cannot be reproduced from the optical recording medium.

Specifically, the reproducing apparatus has a cut-off spatial frequency of an MTF (modulation transfer function) which becomes an index of a resolving power which is determined based on the reproducing optical system For this reason, the numerical aperture N. A. of the objective lens of the optical system is increased in such a manner that the reproducing apparatus can cope with the recording pattern in which the cycle of the pits is short.

Further, it is attempted to improve a diffraction limit of reproducing light by using reproducing light having a short wavelength. At present, as this reproducing light, there is used laser light having a double higher harmonic wave (wavelength is 532 m) of a semiconductor laser excitation YAG laser or laser light having a double harmonic wave (wavelength is 425 nm) which results from directly converting laser light of a semiconductor laser by an SHG (secondary harmonic generation) element based on a non-linear optical crystal. Further, there is used blue-violet semiconductor laser light having a wavelength of 400 nm which is generated by a nitride semiconductor InGaN-based semiconductor laser or the like.

Although there have been proposed or manufactured trial optical disks in which the recording layers of multilayers are laminated in order to further increase a recording capacity of the optical disk [K. Nishiuchi, Jpn. J. Appl Phys, Vol. 38, N03B, (1998), page 2163], if refractive indexes of respective layers become different, then a multiple beam interference of laser light occurs so that an interlayer crosstalk (intersymbol interference) tends to occur. Moreover, since it becomes difficult to focus light on the respective layers, transparent layers having a sufficiently large thickness of approximately several 10s of micrometers should be provided between respective recording layers Furthermore, if the number of layers increases, then reflected light is decreased from the distant layer so that it becomes difficult to obtain a satisfactory S/N (signal-to-noise ratio). Therefore, in actual practice, the number of multilayers is limited to several layers.

With a view to increasing a recording density and a storage capacity of an optical recording medium, there have been proposed an optical disk which makes effective use of fluorescence (edg., Japanese published patent application No. 7-77028) and an optical disk which makes effective use of thermoluminescence light (e.g., Japanese laid-open patent application No. 7-215871.

Further, there has been proposed an optical disk in which a cut-off spatial frequency can be increased about twice by detecting an optical disk in which micro-light-emission points are formed by filling a fluorescent substance into recording pits on the substrate by means of a confocal optical system so that recorded information can be reproduced with a higher resolving power (Japanese patent No. 2904434).

Furthermore, as a method of recording information in a three-dimensional fashion, there has been proposed a multilayer disk in which a plurality of light-emission layers are laminated through transparent mediums as information recording layers (U.S. Pat. No. 4090031, WO98/25262).

However, when a multilayer optical disk which makes effective use of light emission is realized, there arise the following problems In the write-once optical disk which has heretofore been proposed, there are formed portions whose intensity of light emission is low by forming holes by heating fusion or sublimation or abrasion based on local heating of laser light or thermal deformation based on similar action or by locally changing the portions into other products whose luminous efficiency is lowered (or non-light-emission) based on thermolys is.

Furthermore, in a light-emission type optical disk in which a photochromic material used as a recording material and a fluorescent pigment are dispersed and mixed, there has been proposed a write-once type optical disk in which a recording sensitivity can be increased by using a mobility of energy between the photochromic material and the fluorescent pigment (Japanese patent No. 2,502,785).

In these cases, since the organic light-emission layer plays a role of a recording layer, there arise problems that there are few optical function materials which can meet with the above objects, the organic light-emission layer is inferior in durability and life-span, is unable to generate a sufficient luminous efficiency and whose detection signal is too small to maintain a sufficient S/N. Moreover, the above optical disk cannot be made rewritable.

Furthermore, there has been proposed a rewritable type multilayer optical disk in which a photon-mode recording can be executed based on a reversible photochemistry reaction by effectively utilizing a two-photon absorption process of a non-linear optical material (U.S. Pat. No. 5,268,862) In this case, in order to obtain ultrashort pulse light having a high peak power, a laser light source of a recording and reproducing apparatus becomes expensive, and an apparatus becomes large in size and complicated in structure due to an optical adjustment.

SUMMARY OF THE INVENTION

It is an object of the present invention to provide an optical recording medium which can realize an optical disk and an optical multilayer disk capable of generating a reproduced signal with a high S/N from the recording pattern of pits formed at a cycle shorter than a diffraction limit $\lambda/(2N. A.)$ of a reproducing optical system and a reproducing apparatus therefor and a recording and reproducing apparatus therefor.

According to an aspect of the present invention, there is provided an optical recording medium which is comprised of a laminated structure portion including a light-emission layer and a recording layer, wherein the light-emission layer is made of a light-emission material being excited by reproducing laser light to emit fluorescent light and the recording layer is made of a material in which a refractive index or an absorption coefficient relative to light emitted from the light-emission layer by recording laser light can be changed. The recording layer is disposed to be closer to a side into which there producing laser light is introduced than the light-emission layer.

Then, recorded information recorded by the change of the refractive index or the absorption coefficient of the recording layer is read out from the light-emission layer with irradiation of the reproducing laser light as the change of intensity of emitted light.

Then, in the optical recording medium according to the present invention, recording laser light and reproducing laser light relative to the recording layer and the light-emission layer are the same laser light and are selectively used by selecting their power.

Alternatively, the recording laser light and the reproducing laser light may be based on different laser light, i.e., laser light having different wavelengths According to another aspect of the present invention, there is provided a reproducing apparatus which is a reproducing apparatus for the above optical recording medium according to the present invention. This reproducing apparatus is comprised of a reproducing laser light source for exciting the light-emission layer, a polarizing beam splitter, a quarter-wave plate, a dichroic mirror, an objective lens, a pinhole and a photodetector for detecting light emitted from the light-emission layer, wherein the light-emission layer of the optical recording medium is excited by irradiating the reproducing laser light on the optical recording medium through the polarizing beam splitters the quarter-wave plate, the dichroic mirror and the objective lens, Returned light, which is light emitted by the excitation and modulated by recording information based on the change of the refractive index or the absorption coefficient of the recording layer, is separated from the reproducing laser light by the dichroic mirror, detected by the photodetector through the pin-hole, and recorded information is read out from the recording layer According to a further aspect of the present invention, there is provided a recording and reproducing apparatus which is a recording and reproducing apparatus for the above optical recording medium according to the present invention. This recording and reproducing apparatus is comprised of a laser light source for generating laser light which serves as recording laser light and the reproducing laser light relative to the recording layer, a polarizing beam splitter, a quarter-wave plate, a dichroic mirror, a pin-hole, an objective lens, and a photodetector for detecting light emitted from the light-emission layer, wherein laser light having a required recording power which is modulated in response to recording information is irradiated on the optical recording medium from the laser light source through the polarizing beam splitter, the quarter-wave plate, the dichroic mirror, and the objective lens to record information on the recording layer of the optical recording medium.

Further, the light-emission layer of this optical recording layer is excited by irradiating reproducing laser light having a power lower than the above recording power on the optical recording medium from the similar laser light source through the above polarizing beam splitter, the quarter-wave plate, the dichroic mirror and the objective lens. Recorded information can be read out from the recording layer by separating returned light of the excited light modulated by recording information obtained by the change of the refractive index or the absorption coefficient of the recording layer from the reproducing laser light with the dichroic mirror and detecting the same through the pin-hole by the photodetector.

As described above, in the optical recording medium and the reproducing apparatus or the recording and reproducing apparatus, the reproducing information signal light is not based on the returned light of the reproducing laser light but is based on light which results from modulating light emitted from the light-emission layer excited by reproducing laser light in response to recorded information of the recording layer.

DESCRIPTION OF THE PREFERRED EMBODIMENTS

The present invention will now be described below with reference to the accompanying drawings.

Figure 1:
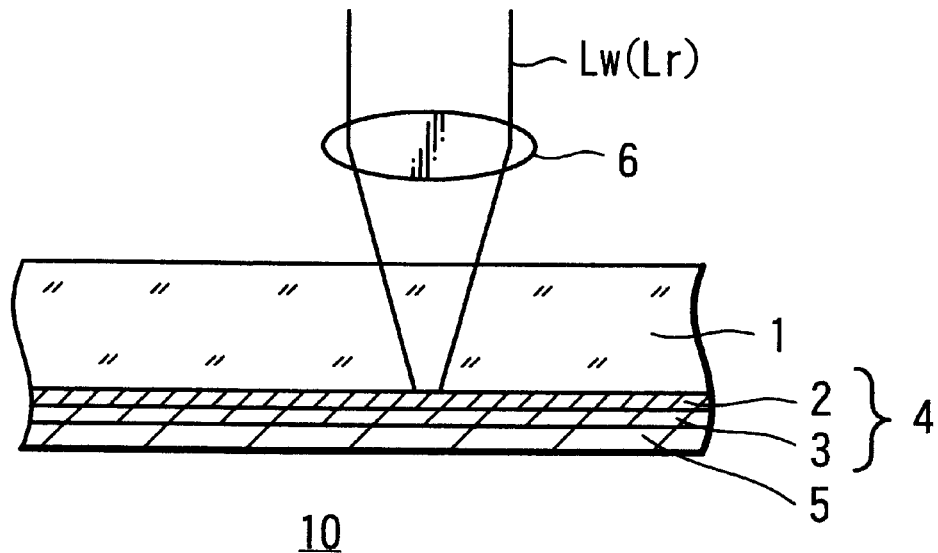
FIG. 1 is a schematic cross-sectional view of a fundamental arrangement of an optical recording medium according to the present invention.
Figure 2:
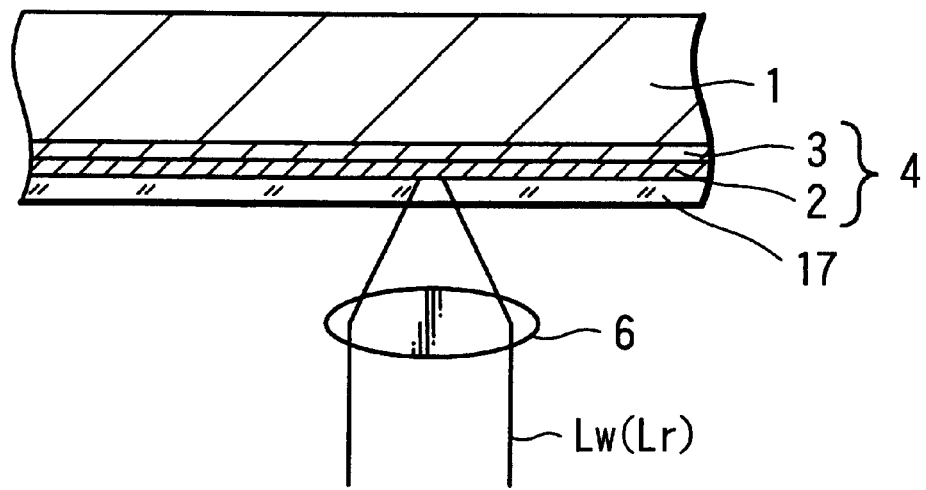
FIG. 2 is a schematic cross-sectional view of a fundamental arrangement of an optical recording medium according to the present invention.

FIGS. 1 and 2 are schematic cross-sectional views showing a fundamental arrangement of an optical recording medium 10 according to the present invention.

In the arrangement shown in FIG. 1, on a substrate 1 made of a transparent substrate, there is formed a laminated structure portion 4 on which a recording layer 2 and a light-emission layer 3 are formed sequentially A protecting film 5 is deposited on the surface of this laminated structure portion 4.

The light-emission layer 3 is made of a light-emission material which generates fluorescence by the excitation of reproducing laser light.

The recording layer 2 is made of a material in which at least a refractive index or an absorption coefficient can be changed relative to light emitted from the light-emission layer 3 by recording laser light.

When information is recorded on an optical recording medium 10, recording laser light Lw is modulated on and off in response to recording information and irradiated on the recording layer 2 from the substrate 1 side through the objective lens 6 and information is recorded on the recording layer 2 as the change of the refractive index or the absorption coefficient while the recording laser light is scanning the optical recording medium 10.

Further, when recorded information is read out from this optical recording medium 10, while reproducing laser light Lr is similarly scanning the optical recording medium 10 from the side of the substrate 1 through the objective lens 6, fluorescence is generated from the light-emission layer 3 and recorded information is read out from the optical recording medium as the change of the intensity of light based on the change of the refractive index or the absorption coefficient changed in response to the recorded information in the recording layer 2 relative to this emitted light.

In the arrangement shown in FIG. 2, the laminated structure portion 4 in which the light-emission layer 3 and the recording layer 2, in this case, are sequentially formed is constructed on the substrate 1 which maybe either the transparent substrate or not. Then, a light transmittance layer 7 having a thickness ranging from 10 $\mu$m to 177 $\mu$m is deposited on the surface of this laminated structure portion 4.

Then, information is recorded and reproduced by irradiating the recording laser light Lw and the reproducing laser light Lr from the side of this light transmittance layer 7 similarly to FIG. 1.

In the above recording laser light Lw and reproducing laser light Lr, there can be used the same laser light in which reproducing laser power is lowered to the level under which recorded information that had already been recorded cannot be disturbed as compared with the recording laser power or laser light having different wavelengths.

When the recording laser light Lw and the reproducing laser light Lr are assumed to have the same wavelength, the recording and reproducing apparatus can be simplified by making the laser light source section become common. However, when the recording laser light Lw and the reproducing laser light Lr are assumed to be laser beams having different wavelengths, it is possible to effectively avoid characteristics of the recording layer from being deteriorated by the repeated reproductions. Specifically, by optimizing the film arrangement (an optical constant and a thickness of each layer), the energy absorption efficiency of the recording laser light Lw in the recording layer can be increased, the energy absorption efficiency of the reproducing laser light Lr in the recording layer can be decreased, and the absorption efficiency of the reproducing laser light in the light-emission layer can be increased.

The light-emission layer 3 can be comprised of an amorphous layer made of an organic fluorescent pigment by vacuum deposition or a polymer into which an organic fluorescent pigment is dispersed.

As materials comprising the light-emission layer 3, there can be enumerated the following materials.

Specifically, there exist many materials whose excited spectrums exist in the short-wavelength region of ultraviolet, violet and blue light and whose luminous efficiencies are high, and these materials are used in the display technologies, the printing technologies and the like (Japanese laid-open patent application No. 8-252882 and Japanese laid-open patent application No. 9-115668).

As the organic fluorescent materials, there are enumerated materials known as the organic fluorescent materials whose excited light is light of blue near a wavelength 400 nm, i.e. polyphenyl-based material such as anthracene, 9, 10-diphenyl anthracene, oxazol-based material such as POPOP (1, 4-bis(5-phenyl)-2-oxazolyle benzene), dimethyl POPOP and stilbene-based material and anthraquinone-based material.

Moreover, there are enumerated coumarin 4, coumarin 6 and coumarin 7 of coumarin-based pigment of laser pigment material (Exciton Corporation Dye laser material catalogue).

Further, there are enumerated Alq3 (tris-(8-hydroxyquinoline) aluminum) used as display materials of organic EL (electroluminescence) (Tsutsui Tetsuo FUNCTIONAL MATERIALS, Vol. 15, NO. 8 (1995), page 30) and the like.

Of these materials, there exist many materials whose melting point is higher than 150° C. Therefore, there can easily be constructed a light-emission layer having a high luminous efficiency by a uniform amorphous thin film according to vacuum deposition under the condition that the substrate temperature is held at a room temperature.

Then, this light-emission layer 3 can be formed as a uniform thin film in such a manner that the above organic light-emission material is dissolved into a solvent such as ethanol, methanol, toluene, xylene, dichloromethane, dichloroethane, methyl ethyl ketone, diacetone alcohol, isobutyl alcohol, tetrahydrofuran and tetrafluoropropanol by using polymethyl methacrylate, polynethyl acrylate, polycarbonate, polystyrene and polyvinyl alcohol etc as an organic binder and coated on the substrate 1 by spin coat.

From a standpoint of increasing a recording density of an optical recording medium, a wavelength of light emitted from the light-emission layer 3 should preferably be a short-wavelength, However, when recorded information is reproduced, the light emitted from the light-emission layer 3 should be separated from the laser light of the excited light and detected as reproduced signal light. Although this separation characteristic depends upon a separation characteristic of a wavelength separation filter which executes this separation, a rise characteristic of 10% to 90% of spectral transmittance or reflectance is about several 10s of nanometers so that the wavelength of fluorescent light should be longer than the above wavelength.

As the recording layer 2, there can be used a variety of many materials such as photo sensitive organic pigments (Nanba, 0 plus E NO. 196, March 1996, page 100), photochromic materials (Irie, 0 plus E NO. 196, March 1996, page 95) and phase-change recording materials (Ohta, Applied Physics, Vol 69, NO, 1, 2000, page 73).

For example, the recording layer 2 can be formed as a write-once recording layer based on a photosensitive organic pigment, and the optical recording medium 10 can be formed as a write-once optical recording medium.

In this case, recorded information can be read out by modulating light emitted from the light-emission layer 3 with the irradiation of reproducing laser light by recording pits, i. e., recording information recorded as the change of the refractive index of the recording layer 2 based on the photosensitive organic pigment At that time, when the numerical value calculation concerning the multiple beam interference of light in the laminated film arrangement is executed, recorded pits which become portions whose light-emission intensity is either high or low can arbitrarily be selected by optimum design of film arrangement (an optical constant and a film thickness of each layer) Since the multiple beam interference effect is effective for extending an effective optical path length even when the change of the refractive index is small, there can be obtained a large modulation depth, A method of this numerical value calculation is described in S Ciancalenoni et al J Opt Soc. Am. B, Vol. 14, NO. 7, 1997, F. De Martini et al. J. Opt. Soc. Ar. B, Vol. 10, NO 2, 1993.

Moreover, the recording layer 2 can be formed as a rewritable recording layer made of a phase-change type recording material, and the optical recording medium 10 can be formed as a rewritable optical recording medium.

In this phase-change type optical recording, with the irradiation of ultraviolet light or short-wavelength visible light corresponding to a predetermined recording signal, the local crystal state of the recording layer 2 is reversibly changed from the amorphous state to the crystal state or from the crystal state to the amorphous state, there by making it possible to change the refractive index or the absorption factor.

Also in this case, light emitted from the light-emission layer 3 is modulated by the recording pits based on the change of the refractive index or the absorption factor of the recording layer made of the phase-change layer, whereby recorded information can be read out.

Then, if erasing laser beams are used similarly to the ordinary phase-change type optical disk, then recording pits can be erased If a phase-change recording material having a short crystallization time is used, then information can be overwritten in the optical disk.

In the light-emission layer 3, the heat design should be executed in such a manner that the light-emission layer 3 may not be heat-deformed and heat-decomposed by the irradiation of recording laser light upon recording, and optical information should be written or erased at the optimum power.

To this end, a dielectric layer having a low thermal conductivity is interposed between the recording layer 2 and the light-emission layer 3 and a heat-insulation effect can be achieved between the recording layer 2 and the light-emission layer 3 by the dielectric layer Thus, not only in the recording mode but also in the reproducing mode, a temperature rise can be prevented from occurring in the light-emission layer 3 by the energy of laser light absorbed in the recording layer, and a temperature quenching of the light-emission layer 3 (decay of luminous efficiency due to the temperature rise) can be prevented Also, upon reproduction, a high luminous efficiency can be expected.

Further, when the recording layer 2 is made of the photosensitive organic pigment material, there can be achieved effects of a blocking (barrier) layer for preventing the photosensitive organic pigment of the recording layer 2 and the fluorescent pigment of the light-emission layer 3 from being diffused and moved with each other.

If the laminated structure portion 4 of the recording layer 2 and the light-emission layer 3 is formed as a microresonator structure, then the intensity of light emitted from the light-emission layer 3 can be increased and the recording sensitivity of the recording layer 2 can be improved For example, first and second reflecting films are disposed across the laminated structure portion 4 and a space between the first and second reflecting films is selected to be less than the wavelength of the reproducing laser light or/and light emitted from the light-emission layer 3.

With the above arrangement, the intensity of the light emitted from the light-emission layer 3 can be increased and the signal intensity and the signal modulation depth can be increased.

Specifically, a Fabry-Perot resonator is constructed between the first and second reflecting films so that it becomes possible to more aggressively use the multiple beam interference effect in the laminated structure portion 4. In this case, the light-emission layer 3 and the recording layer 2 between the first and second reflecting films are served as spacer layers within the resonator If the thickness of the spacer layers becomes approximately the same as the wavelength of light or less than the wavelength of light, preferably, approximately ½ wavelength and ¼ wavelength, then there can be achieved a so-called micro-resonator (S. Ciancaleoni et al J. Opt. Soc Am. B, Vol. 14, NO. 7, 1997, p1556, F. De Martini et al. J. Opt. Soc . Am. B, Vol. 10, NO. 2, 1993, page 360, Yamanishi Masamichi, AppliedPhysics (SynthesizedReport), Vol. 63, NO. 9, 1994, page 885).

Figure 3:
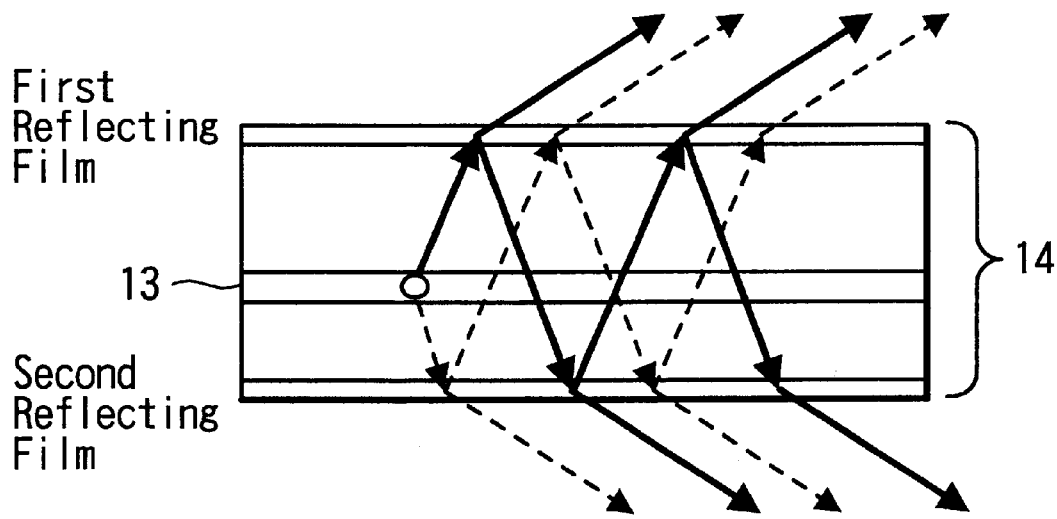
FIG. 3 is a diagram to which reference will be made in explaining a multiple beam interference of an optical recording medium according to the present invention.

Let us consider a model in which a spacer layer 14 having a light-emission layer 13 is interposed between semi-transparent first and second reflecting films 11 and 12 as shown in FIG. 3. Considering the internal reflection of light in the first and second reflecting films 11 and 12, light emitted from the light-emission layer 13 can substantially be explained by a classical electromagnetic interpretation which is a multiple beam interference of light-waves which are both placed in a mirror-image relationship.

At that times although the light emitted from the light-emission layer 3 is the natural radiation, its directivity (emitted light intensity angle distribution) is changed depending upon the resonance conditions. Upon resonance, since the intensity of light relative to the direction normal to the film surface increases, as a result, the change of the intensity of light detected from the recording layer can be increased (i e., increase of signal modulation depth).

In actual practice, factors concerning light emitted from the light-emission layer 3 and received by the detector which detects detection light of recorded information from the optical recording medium in the reproducing apparatus or in the recording and reproducing apparatus for the optical recording medium, which will be described later on, are determined based on the light excited on the light-emission layer 3, ie., the reproducing laser light absorption efficiency, the efficiency at which emitted light is outputted to the outside and which includes the multiple beam interference and the luminous efficiency decay ratio (temperature quenching) caused by the temperature rise in the light-emission layer 3.

The multiple beam interference of both of the excited light (reproducing laser light) and the emitted light can be achieved by optimizing the film structure such as the optical constant and the film thickness of the film in order to increase the intensity of emitted light and the modulation depth Then, the resonance condition can be realized by varying the optical distance (i.e., refractive index, thickness of a spacer layer) of the spacer layer In the present invention, the optical constant of the organic photosensitive pigment layer or the phase-change type recording layer changed before and after the recording corresponds to the resonance condition. In the case of the organic photosensitive pigment, the change of the refractive index mainly corresponds to the resonance condition, In the case of the phase-change type recording material, the change of the absorption coefficient corresponds to the resonance condition.

The above micro-resonator structure is comprised of the first and second reflecting films. When the recording layer 2 is comprised of a material such as the phase-change type recording material having the large absorption coefficient, since the reflectance in this layer is high, the micro-resonator structure is constructed on this recording layer 2 serving as one reflecting film and the reflecting film formed on the light-emission layer 3 of the laminated structure portion 4.

In this case, the resonator is constructed under the condition that the spacing between the reflecting film and the recording layer, i.e, thickness of the light-emission layer 3 is selected to be less than at least any one of wavelengths of the reproducing laser light and the light emitted from the light-emission layer 3.

Since the optical recording medium according to the present invention need not increase the reflectance of the resonator very high, the reflecting film is formed as the semi-transparent reflecting film.

Such semi-transparent reflecting film is comprised of a metal reflecting film having a thickness less than 50 nm, for example.

Alternatively, the semi-transparent film can be comprised of a dielectric multilayer reflecting film. In this case, since reflecting/transmittance characteristics can be varied relative to lights with different wavelengths by design of the film arrangement, the reflectance for the excited light, i.e., reproducing laser light can be set to be low, and the reflectance for the light emitted from the light-emission layer 3 within the resonator can be set to be high.

As described above, the reflecting film is comprised of the ultra-thin metal thin film or the multilayer dielectric reflecting film, whereby the transmittance can be improved. Moreover, the optical recording medium in which the interlayer crosstalk can be suppressed can be constructed by changing a wavelength of light emitted from each layer.

Under the recent situation, the increase of the high density of the optical disk is being promoted by increasing the numerical aperture N. A. of the objective lens in the recording and reproducing apparatus, i.e., optical pickup, by decreasing the diameter of the spot of the irradiated laser light and by decreasing the track pitch.

In this case, the aberration amount of the spot relative to the constant inclination of the optical recording medium, i.e., so-called disk skew and the degree of the deterioration of the reproduced signal become remarkable. When the reproducing laser light is irradiated from the side of the transparent substrate whose thickness is selected to be 1.2 mm, for example, there is no solution excepting that a substance such as a glass substrate having a sufficient flatness and which can be prevented from being deformed is used as this transparent substrate.

To solve this problem, when the numerical aperture N. A. of the objective lens is greater than 0.78 and laser light having a short wavelength, e.g., wavelength ranging from 350 nm to 450 nm is used, as described with reference to FIG. 2, recording laser light and reproducing laser light should preferably be irradiated from the side of the light transmittance layer 7 having a thickness ranging from 10 $\mu$m to 177 $\mu$m.

This light transmittance layer 7 may be made of a ultraviolet-curing resin or this light transmittance layer 7 may be formed on the recording layer 2 through a transparent bonding layer by using a transparent flat plate made of polycarbonate, a glass plate or the like.

Next, the inventive examples of the optical recording medium according to the present invention will be described below but the present invention is not limited to the following inventive examples.

FIRST INVENTIVE EXAMPLE

In this inventive example, the optical recording medium is formed as a write-once type optical disk.

Figure 4:
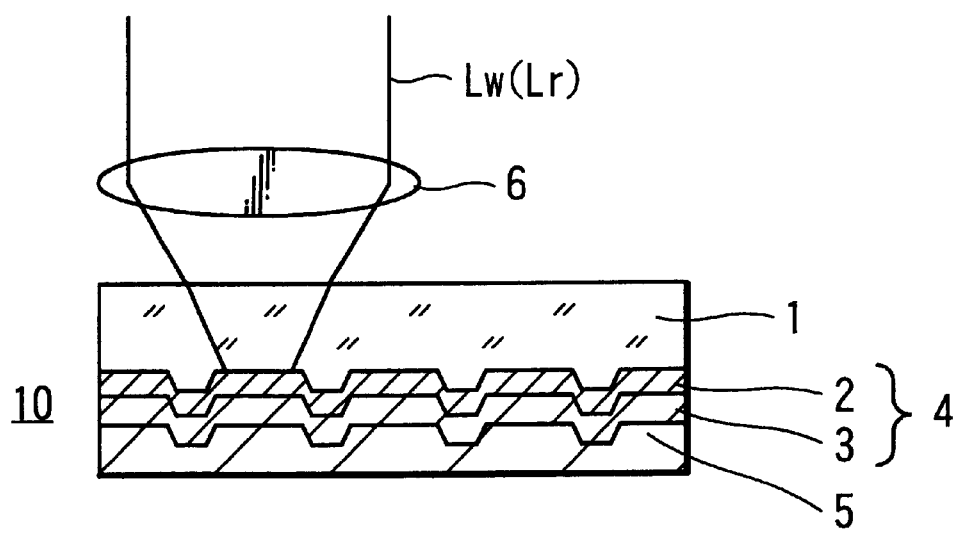
FIG. 4 is a schematic cross-sectional view of an example of an optical recording medium according to the present invention.

FIG. 4 is a schematic cross-sectional view showing the case in which the optical recording medium is formed as the write-once optical disk. In this inventive example, a laminated structure portion 4 comprised of the photosensitive pigment recording layer 2 and the organic light-emission layer 3 is formed on the substrate 1 and a protecting film 5 is formed on the surface of the laminated structure portion 4.

The substrate 1 is made of a polycarbonate substrate, for example, having a thickness of 112 mm in which a guide groove is transferred and molded by injection molding, The recording layer 2 was formed on the substrate 1 by coating a paint in which a cyanine-based organic photosensitive pigment having a thickness of about 100 nm is dissolved by using tetrafluoropropanol as a solvent according to spin coat.

On this recording layer 2, there was coated the light-emission layer 3 made of an organic light-emission material. As the organic light-emission material, there was a commercially-available green organic pigment fluorescent paint. This green organic pigment fluorescent paint was deposited so as to have a film thickness of 100 nm by spin coat.

Figure 5:
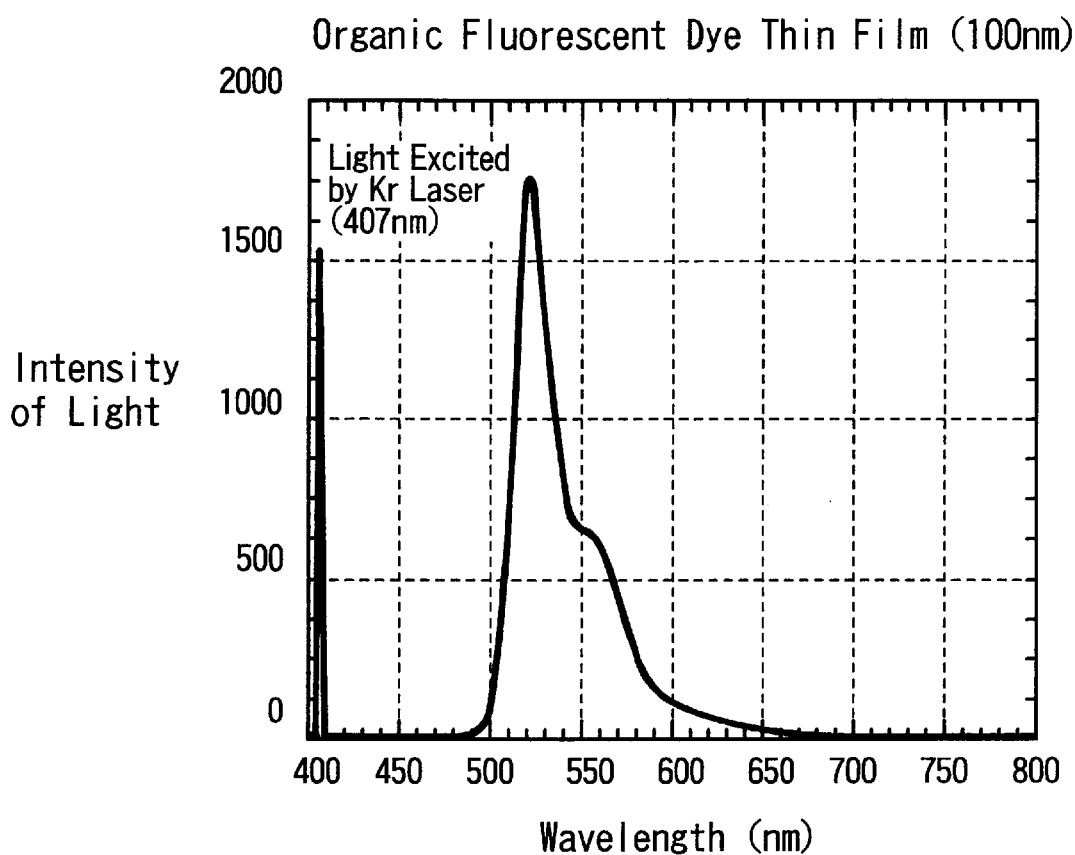
FIG. 5 is a diagram of an emission spectrum of an organic dye luminous paint.

FIG. 5 shows an emission spectrum of this organic pigment fluorescent paint. When this paint is excited by Kr laser light having a wavelength of 407 nm, this paint demonstrates a center wavelength of 520 nm and a half width of about 50 nm.

Then, on this light-emission layer 3, there was formed the protecting film 5 by coating a ultraviolet-curing resin having a thickness of about 100 μm according to spin coat.

Immediately after the respective layers had been deposited by spin coat, the product was dried one hour in a constant-temperature bath at 60° C.

SECOND INVENTIVE EXAMPLE

In this inventive example, the optical recording medium is formed as the rewritable optical disk.

Figure 6:
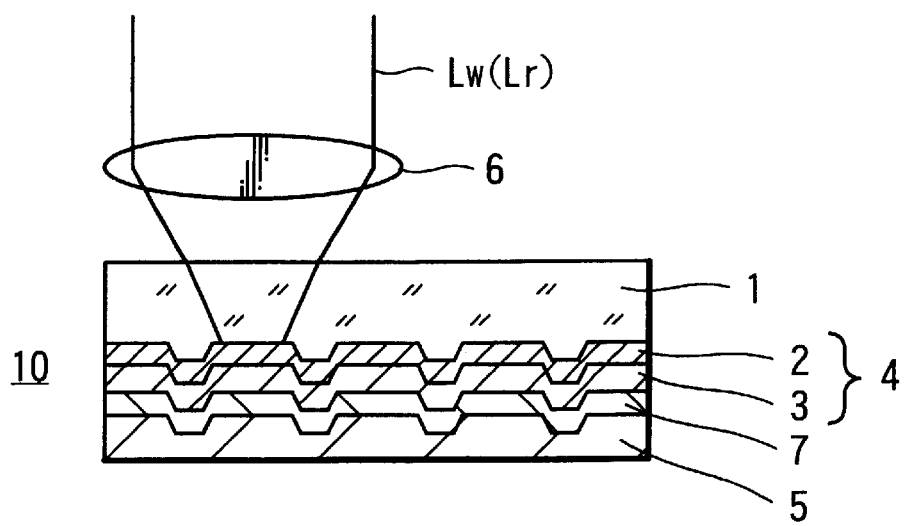
FIG. 6 is a schematic cross-sectional view of an example of an optical recording medium according to the present invention.

FIG. 6 is a schematic cross-sectional view showing this rewritable optical disk.

In this inventive example, similarly as described above, on a polycarbonate substrate 1, for example, having a thickness of 1.2 mm in which a guide groove is transferred and molded by injection molding, there was formed a laminated structure portion 4 comprised of a phase-change type recording layer 2 and an organic light-emission layer 3. On the laminated structure portion 4, there were formed a reflecting film 7 and a protecting film 5.

The phase-change type recording layer 2 had the multilayer structure comprised of $ZnS-SiO_2$ having a film thickness of 30 nm, $Ge_2Sb_2Te_5$ having a film thickness of 10 nm and $ZnS-SiO_2$ having a film thickness of 40 nm. These $ZnS-SiO_2$ and $Ge_2Sb_2Te_5$ are deposited by using sintered target of $ZnS-SiO_2$ and $Ge_2Sb_2Te_5$ alloy target according to RF (radio-frequency) sputtering.

When each layer was formed, Ar operation gas flow rate was adjusted by adjusting a valve of an exhaust system in such a manner that a sputtering gas pressure became 3 mTorr, anelectric power of an RF power supply was selected to be 30 W and a growth rate was 5 nm/minute. Moreover, the substrate was rotated (the substrate revolves) in order to maintain a uniform film thickness.

Subsequently, an organic light-emission layer 3 was deposited. When this organic light-emission layer 3 was deposited, the organic light-emission layer 3 having a film thickness of 100 nm was deposited by co-vapor-depositing Alq3 (tris-(8-hydroxyquinoline)aluminum) and coumarin 6 (manufactured by Exciton Corporation) by using a vacuum deposition machine having two vapor deposition sources while the substrate is rotated at a vapor deposition rate of 30:1. Next, an aluminum thin film having a thickness of 80 nm was deposited as the reflecting film 7 by DC sputtering. At that time, a gas pressure was 3 mTorr, and an electric power used was 20 W.

On this reflecting film 7, there was finally deposited the protecting film 5 by spin coat similarly to the above first inventive example.

THIRD INCENTIVE EXAMPLE

In this inventive example, the optical recording medium is formed as a rewritable optical disk in which a dielectric heat-insulation film is interposed between the recording layer 2 and the light-emission layer 3.

Figure 7:
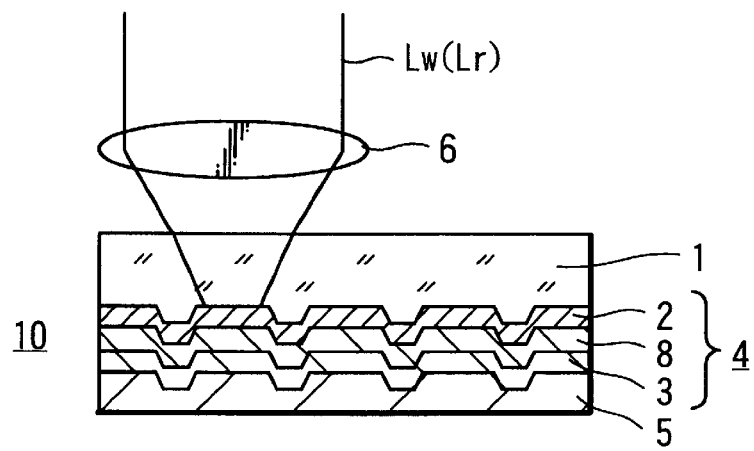
FIG. 7 is a schematic cross-sectional view of an example of an optical recording medium according to the present invention.

FIG. 7 is a schematic cross-sectional view showing a rewritable optical disk according to the third inventive example.

In this inventive example, the similar phase-change type recording layer 2 was formed on the substrate 1 similar to that of the above second inventive example Then, a heat-insulation dielectric layer 8 made of $Sio_2$ was formed on the recording layer 2. Then, the laminated structure portion 4 was constructed by depositing an organic insulating layer light-emission layer 3 similar to that of the second inventive example on the recording layer 2 through this dielectric layer 8. Then, the above protecting film 5 was formed on this laminated structure portion 4.

FOURTH INVENTIVE EXAMPLE

In this inventive example, the optical recording medium is formed as a rewritable optical disk and its laminated structure portion is formed as a micro-resonator.

Figure 8:
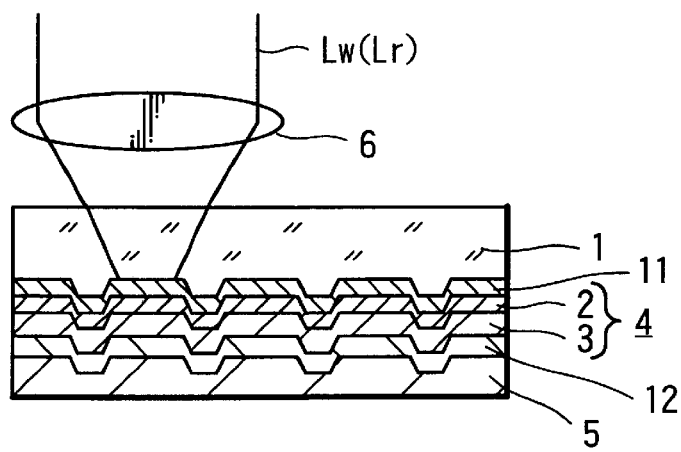
FIG. 8 is a schematic cross-sectional view of an example of an optical recording medium according to the present invention.

FIG. 8 is a schematic cross-sectional view showing an example of an optical disk according to this inventive example.

In this inventive example, this optical disk includes a substrate 1 on which there are deposited a first reflecting film 11 made of a semi-transparent reflecting film, a phase-change type recording layer 2, an organic light-emission layer 3, a second reflecting film 12 and a protecting film 5.

The substrate 1 was comprised of a polycarbonate substrate, for example, having a thickness of 1.2 mm in which a guide groove is transferred and molded by injection molding. On this substrate 1, there was deposited a semi-transparent reflecting film 11 having a thickness of 20 nm by using a silver target with a high purity according to DC (direct current) sputtering. A phase-change type recording layer 2 having an arrangement similar to that of the second inventive example was deposited on this semi-transparent reflecting film 11.

Then, an organic light-emission layer 3 having a thickness of 100 nm was deposited on this recording layer 2. As this organic light-emission material, there was used such a material in which 10 mg of powder of Sulforhodamine (manufactured by Exciton Corporation) was dissolved into an acryl-based UV (ultraviolet)-curing resin with 50 ml of ethanol and then sufficiently stirred The above organic light-emission material is not limited to the above-mentioned done. Specifically, as the previously-described organic light-emission material, there may be used such one in which various pigments such as diphenyl anthracene, coumarin 4, coumarin 6, coumarin 7, Rhodamine B were dispersed into PMMA (polymethyl methacrylate) with a viscosity of about 10 cps.

Thereafter, there was deposited a second reflecting film 12 having a thickness of 50 nm comprised of a semi-transparent reflecting film by using a silver target with a high purity according to DC sputtering. Then, a protecting film 5 similar to the aforementioned one was deposited on the second reflecting film 12.

FIFTH INVENTIVE EXAMPLE

Figure 9:
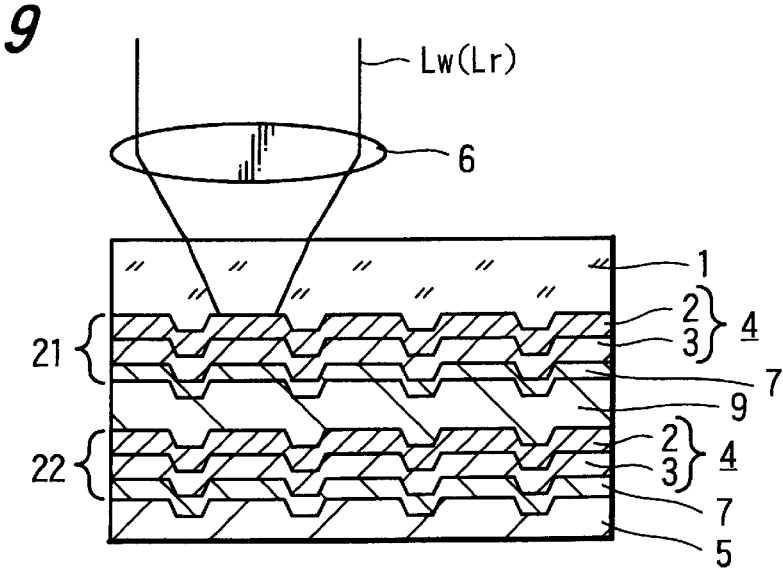
FIG. 9 is a schematic cross-sectional view of an example of an optical recording medium according to the present invention.

In this inventive example, the optical recording mediums have the write-once multilayer structure. FIG. 9 is a schematic cross-sectional view showing an example of an optical disk based on this arrangement. In this inventive example, the optical recording medium has the multilayer structure in which first and second information recording layers 21 and 22 in which a reflecting film 7 is formed on the laminated structure portion 4 having at least a recording layer 2 and a light-emission layer 3 are laminated with each other.

In this inventive example, a photosensitive pigment recording layer 2 and an organic light-emission layer 3 similar to those described in the first inventive example were deposited on the substrate 1. Then, on this organic light-emission layer 3, there was deposited the reflecting film 7 having a dielectric multilayer reflecting film arrangement based on a repeated laminated structure of $SiO_2$ and $TiO_2$ having a center design wavelength ($\lambda_o$) of 560 nm and whose optical film thickness (refractive index×film thickness) is a quarter wavelength ($\lambda_o/4$) by ion beam sputtering.

After an intermediate light transmittance layer 9 made of a polyer sheet, e.g., polycarbonate sheet having a thickness of 50 μm in which a guide groove is formed similarly to the substrate 1 was attached to the side of this reflecting film 7 by an adhesive agent, the second information recording layer 22 was sequentially formed by a process similar to that of the first information recording layer 21, and an Al film having a film thickness of 30 nm was deposited on the second information recording layer 22 by DC sputtering, thereby resulting in the reflecting film 7 being deposited on the second information recording layer 22.

Then, a protecting film 5 of an ultraviolet-curing resin was deposited on this reflecting film 7.

SIXTH INVENTIVE EXAMPLE

Figure 10:
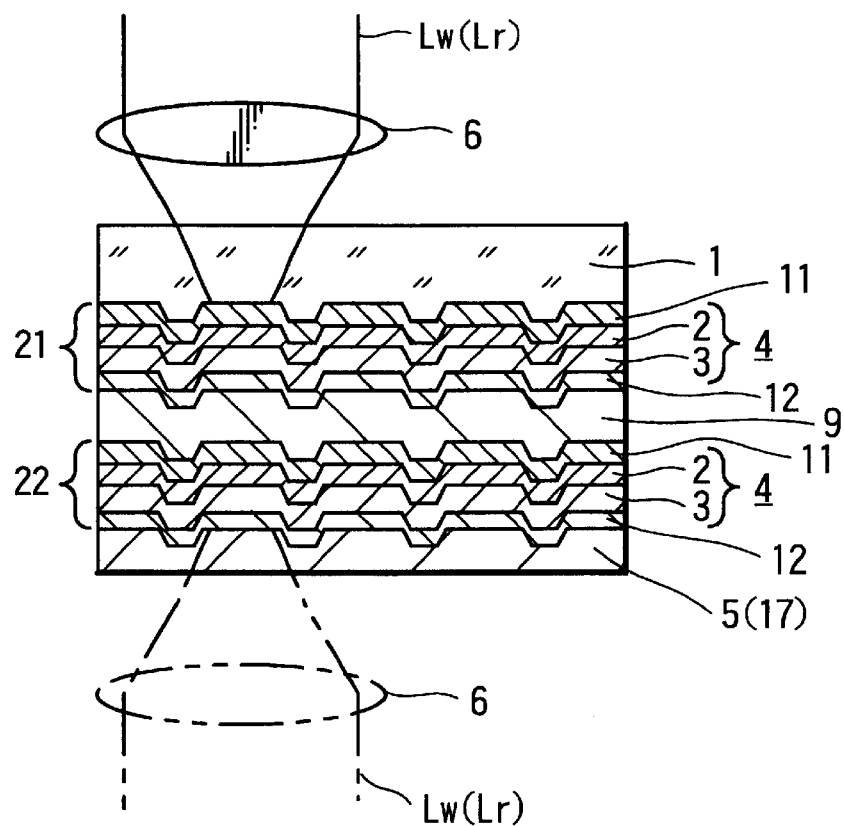
FIG. 10 is a schematic cross-sectional view of an example of an optical recording medium according to the present invention.

In this inventive example, the optical recording medium has a rewritable type micro-resonator multilayer structure. FIG. 10 is a schematic cross-sectional view showing an example of an optical disk having such an arrangement.

Also in this inventive example, the optical disk has the laminated structure of first and second information recording layers 21 and 22 having laminated structure portions 4, each having a micro-resonator arrangement.

In this inventive example, similarly to the above fourth inventive example, on a substrate 1, there was formed a first information recording layer 21 on which there were deposited a first reflecting film 11 based on a high-purity Ag semi-transparent reflecting film, a recording layer 2 based on a phase-change type recording layer, an organic light-emission layer 3 based on vapor deposition and a second reflecting film 12 based on a high-purity Ag semi-transparent reflecting file similar intermediate light transmittance layer similar to that of the fifth inventive example was bonded on the first information recording layer 21. Then, on the first information recording layer 21, there was formed a second information recording layer 22 on which there were deposited a first reflecting film 11 based on a high-purity Ag semi-transparent reflecting filmy a recording layer 2 based on a phase-change type recording layer, an organic light-emission layer 3 based on vapor deposition and a second reflecting film 12 based on a high-purity Ag semi-transparent reflecting film.

Then, a protecting film 5 based on an ultraviolet-curing resin was deposited on the second information recording layer 22.

SEVENTH INVENTIVE EXAMPLE

In this inventive example, while the optical recording medium may have an arrangement similar to that of the above sixth inventive example shown in FIG. 10, in this case, the protecting film 5 is replaced with a light transmittance layer 17 made of a polycarbonate sheet having a thickness ranging from 10 μm to 177 μm, eg. 100 μm.

Then, the recording laser light Lw and the reproducing laser light Lr are irradiated on the optical recording medium 10 according to this inventive example from the side of the light transmittance layer 17 as shown by a dot-and-dash line in FIG. 10.

An objective lens 6 of a recording and reproducing optical system having an N. A. of 0.85 was used at that time. Since the light transmittance layer 15 has a small thickness of 100 μm, there can be obtained a sufficiently large tolerance such as a skew of the optical recording medium 10.

A recorded signal can be reproduced from the above optical recording medium 10 according to the present invention by reproducing laser light having a wavelength similar to that of recording laser light whose power can be stably servo-controlled and whose power is sufficiently lowered while the objective lens 6 is scanning the optical recording medium 10 with a diameter of a spot of a diffraction limit.

Light, i.e,. fluorescent light from the light-emission layer 2 is generated when only the portion of the light-emission layer 2 irradiated with reproducing laser light is excited and therefore can be regarded as light emitted from substantially a point source of light. Accordingly, the fluorescent light for obtaining a reproducing signal from the optical recording medium is passed through the objective lens and is thereby collimated as substantially parallel beam. As the numerical aperture N. A. of the objective lens increases, a diameter of a beam spot of excited light of the light-emission layer 3, i.e., reproducing laser light can be decreased so that a recording density can be increased and an optical focusing efficiency can be increased, thereby making it possible to obtain a large reproduced signal Thus, there can be achieved an effect that an S/N can be improved.

Figure 11:
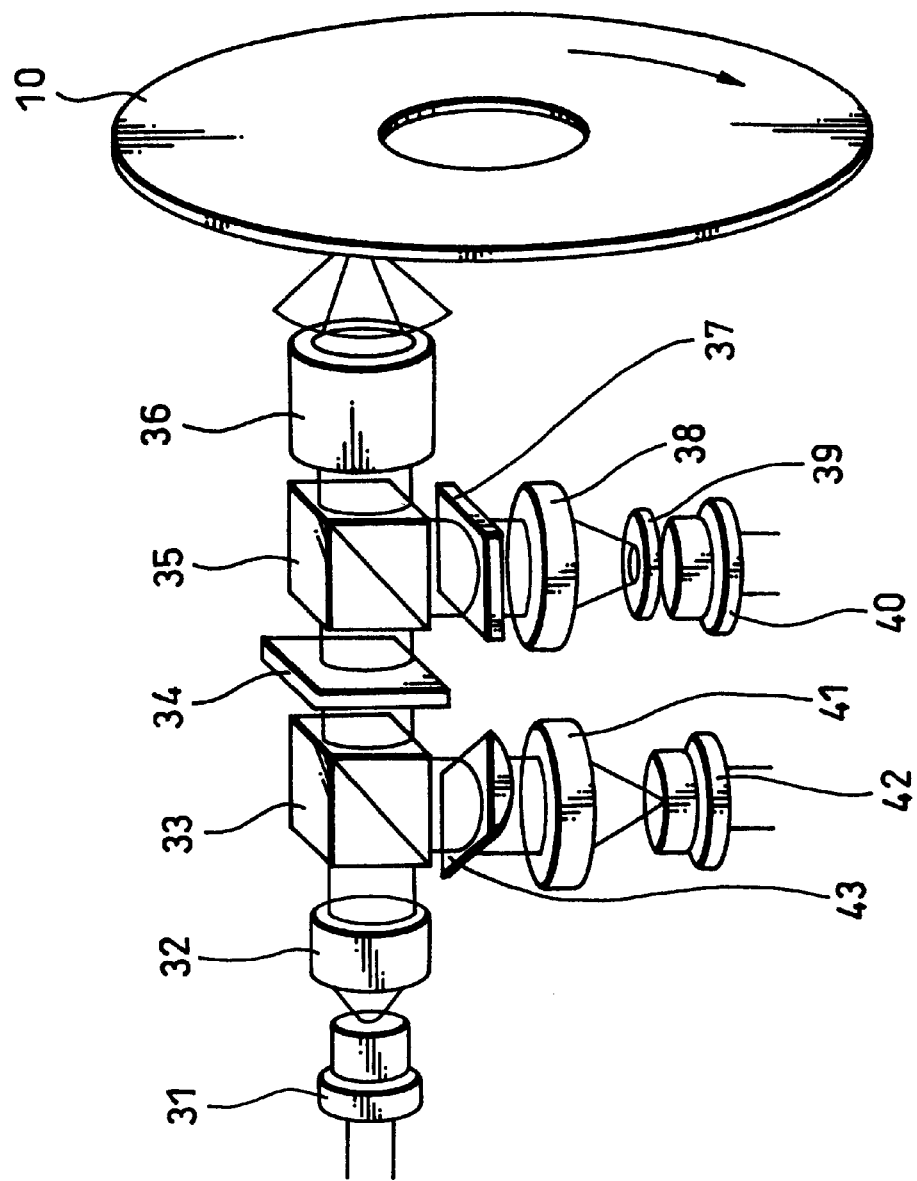
FIG. 11 is a perspective view of an example of a reproducing apparatus or a recording and reproducing apparatus according to the present invention.

FIG. 11 shows a schematic arrangement of a reproducing apparatus according to an embodiment of the present invention. In this embodiment, as shown in FIG. 11, this reproducing apparatus comprises a laser light source 31 made of a semiconductor laser having a short wavelength, e.g., about 400 nm, a collimator lens 32, a polarizing beam splitter 33, a quarter-wave plate 34, a dichroic mirror 35, an objective lens 36 with a high N. A. which was designed for optimum by a wavelength of laser light, a color filter 37, a collimator lens 38, a pin-hole provided according to necessity, a photodetector 40 such as a PIN photodiode or avalanche photodiode for detecting light emitted from the light-emission layer 3, a cylindrical lens 43, a collimator lens 41 and a photodetector 42 such as a photodiode for detecting laser light.

The polarizing beam splitter 33 has an arrangement for passing linearly-polarized light of reproducing laser light and which reflects circularly-polarized light.

Figure 12:
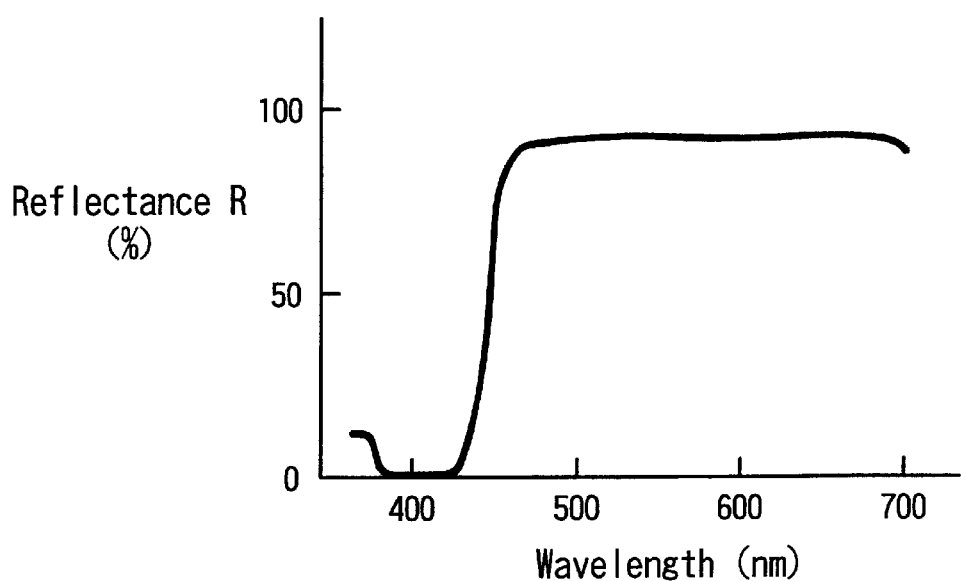
FIG. 12 is a characteristic graph of a reflection characteristic curve of a dichroic mirror.

The dichroic mirror 35 has a characteristic for demonstrating a low reflectance at a wavelength near 400 nm and which demonstrates a high reflectance at a wavelength longer than 450 nm as shown in FIG. 12 which shows a reflection characteristic of the dichroic mirror 35. Specifically, the dichroic mirror 35 has a characteristic for passing laser light from the laser light source and which reflects light emitted from the light-emission layer of the optical recording medium 10.

The color filter 37 has a characteristic for passing light emitted from the light-emission layer 3 and which interrupts laser light having other wavelength.

With this arrangement, a signal recorded on the optical recording medium 10 can be reproduced When the recorded signal is reproduced from the optical recording medium 10, while the optical recording medium 10, e.g., optical disk is being rotated, the reproducing laser light Lr of the linearly-polarized light from the semiconductor laser of the laser light source 31 is collimated as parallel laser beams by the collimator lens 32, passed through the polarizing beam splitter 32, changed to circularly-polarized light by the quarter-wave plate 34, passed through the dichroic mirror 35, focused to the diffraction limit by the objective lens with high N. A., and thereby irradiated on the optical recording medium 10. Light emitted from the light-emission layer 3 when the light-emission layer 3 is excited with the irradiation of this laser light can be regarded as the point source of light.

Light emitted from this light-emission layer 3 is modulated in intensity by recorded pits recorded in response to recorded information of the recording layer 2, changed to parallel laser beams by the objective lens 36, reflected by the dichroic mirror 35 and introduced through the color filter (sharp-cut filter) 37, the collimator lens 38 and the pin-hole 39 to the photodetector 40 and thereby obtained as a reproduced signal.

At the same time, excited light introduced into the dichroic mirror 35, i.e., reproducing laser light is not reflected by the dichroic mirror 35 but is passed through the dichroic mirror 35. When this dichroic mirror 35 is formed of a dielectric multilayer film, it can suppress a reflectance of excited light to be less than 1%. Then, this excited light is further interrupted to be less than $10^{-4}$% by the color filter (sharp-cut filter) 37 and thereby can be avoided from being introduced into the photodetector 40.

The pin-hole 39 is required to detect a confocal and is able to achieve a super-resolving power effect and to improve a reproducing spatial resolving power. The reproducing apparatus according to this embodiment is also capable of executing ordinary reproduction, and in this case, the pin-hole 39 can be omitted.

On the other hand, reflected-back laser light (excited light) from the optical recording medium 10 is passed through the dichroic mirror 35, changed to linearly-polarized light by the quarter-wave plate 34, reflected by the polarizing beam splitter 33 and focused on the photodetector 42 by the collimator lens 41 and thereby laser light can be detected.

As described above, according to the present invention, since a focusing error signal and a tracking error signal can be detected from the guide groove and the address signal recording portion of the optical recording medium 10 by using returned light (reflected light) of laser light like the prior art, this reproducing apparatus can easily utilize prior-art optical disk servo technologies.

Figure 13:
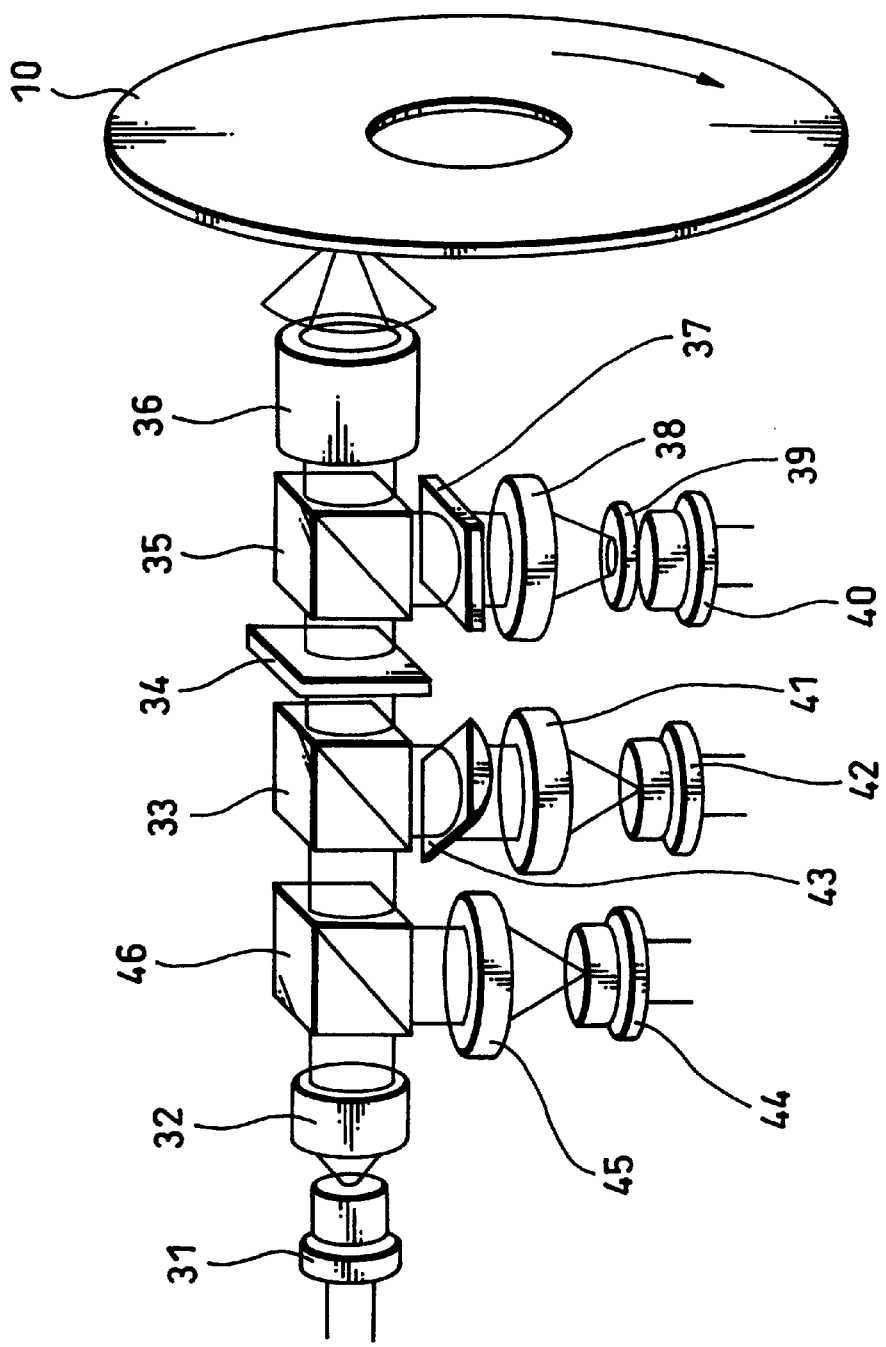
FIG. 13 is a perspective view of an example of a recording and reproducing apparatus according to the present invention

FIG. 13 is a schematic perspective view of a recording and reproducing apparatus according to the present invention, As shown in FIG. 13, the recording and reproducing apparatus according to the present invention can use its laser light source 31, e.g., semiconductor laser as are producing laser light source and as a recording laser light source at the same time, thereby the recording and reproducing apparatus being constructed. A semiconductor laser having a wavelength of 780 nm, for example, is used as a recording laser light source 44 which includes a collimator lens 45 and a dichroic mirror 46. This dichroic mirror 46 passes laser beams from the reproducing laser light source 31 of the semiconductor laser having a wavelength of 400 nm, reflects laser beams from the recording laser light source 44 and synthesizes both of the above laser beams.

In this case, a focusing and tracking servo signal can be obtained from any one of returned light from the recording laser light source 44 or the reproducing laser light source 31.

In FIG. 13, elements and parts identical to those of FIG. 11 are marked with identical reference numerals and therefore need not be described.

Then, when the optical recording medium 10 has the multilayer information recording layer structure shown in FIGS. 9 and 10, for example, the recording and reproducing information recording layer can be selected by driving an actuator having a voice coil arrangement, for example, which delicately moves the objective lens under adjustment by using the focusing error signal.

According to the above apparatus of the present invention, since the apparatus has the confocal detection arrangement, as is described in "Super-resolution Optics" edited by Kawada Satoshi, published by Gakkai Shuppan Center, without being limited by the diffraction limit $\lambda/2N.A.$ of the reproducing optical system, there can be obtained a reproduced signal with a high S/N from the recorded patterns of the pits formed with a shorter period.

Further, since the confocal detection is executed so that a resolving power in the depth direction also is improved, as in the example shown in FIG. 9, when the optical recording medium has the structure in which a plurality of information recording layers 4 are laminated through the intermediate transparent layer 9, recorded information can be reproduced without increasing a crosstalk between the respective information recording layers. As a consequence, there can be achieved an effect that the film thickness of the intermediate light transmittance layer can be decreased to be less than 10 μm, for example.

As described above, according to the optical recording medium of the present invention, the signal light which has read the recorded information from this optical recording medium, i.e., this reproducing signal light and the reproducing laser light (excited light) can be separated from each other with a high wave length selection capability by using the dichroic mirror, for example, in the reproducing apparatus or the recording and reproducing apparatus according to the present invention Specifically, only this reproducing signal light can be introduced into the photodetector 40, there producing laser light which causes a noise can be excluded effectively and only the reproduced signal obtained from the recording pits of the recording layer 2 can be detected, whereby a high S/N can be realized with ease.

Specifically, while dominant factors of noises are disk noise caused by fluctuations of sizes of respective recording pits and luminous efficiency, a shot-noise of a detection system and a thermal noise of an amplifier, according to the present invention, since the intensity of detection light can be increased, the noise of the detection system can sufficiently be suppressed to be low in actual practice.

On the other hand, in the conventional optical memory, since the reproducing light has a principle of a reproduction for detecting an intensity of reflected light and the change of phase by using coherent light like laser light, if there is a little returned light of reproducing light, such returned light would affect the intensity of the detected signal. Therefore, it was difficult to obtain a high S/N.

Moreover, when the optical recording medium according to the present invention is used, since fluorescent light emitted from the light-emission layer 3 need not be used as the servo signal, a contrast can be increased sufficiently. By aggressively using the multiple beam interference effect, for example, it becomes possible to remove the amount of emitted light substantially completely at the portion in which the intensity of emitted light is set to be low.

In the above optical recording medium according to the present invention, since the light recording portion made of the recording layer and the light-emission portion made of the light-emission layer are independently formed and can function, a freedom for selecting materials can be increased.

Therefore, it is possible to easily manufacture a highly-reliable optical recording medium which is high in recording sensitivity.

Moreover, the organic fluorescent pigment can easily select an arbitrary emission spectrum, and therefore there can be obtained a light-emission layer at a low cost and which is high in productivity.

Furthermore, since the optical recording medium according to the above phase-change recording layer arrangement is not based on the optical recording using the so-called two-photon absorption process, there can be constructed the optical recording medium in which information can be recorded and reproduced with ease, i.e., information can be rewritable with ease by using the intensity modulation of one laser light while one laser light source portion, e.g., semiconductor laser is being utilized.

Since the optical recording medium is formed as the micro-resonator structure, it becomes possible to increase the light-emission signal and the modulation depth of the signal Therefore, the S/N can be increased, and hence the recording density of the optical recording medium can be increased.

According to the optical recording medium having a plurality of information recording layer structures of the present invention, without requiring the matching of the refractive index, there can easily be realized an optical recording medium without crosstalk between the recording layers through the relatively thin ultraviolet-curing resin layer or the polymer sheet.

Further, since the optical recording medium has the multilayer information recording layer structure of the micro-resonator structure, the reproducing signal light based on the light emitted from each light-emission layer can be detected without deteriorating the luminous signal from each recording layer. Thus, the capacity of the recording information amount can be increased.

Further, since a resonator mirror matched with a target light-emission wavelength and which has no optical loss can be formed by using the dielectric multilayer reflecting film, the energy loss of the excited light can be reduced. Therefore, when the multilayer disk is realized, the energies of excited light can be uniformly distributed at each recording layer.

As set forth above, according to the optical recording medium of the present invention, the intensity of the emitted light which is the reproducing signal light can be increased, the high S/N can be realized and the high recording density can be realized. Thus, there can be manufactured a highly-reliable rewritable optical recording medium in which the freedom with which the materials comprising the optical recording medium are selected can be increased and which is high in recording sensitivity.

Further, in the optical recording medium having the multilayer information recording layer arrangement, the crosstalk between the recording layers can be avoided.

Furthermore, according to the reproducing apparatus of the present invention using the optical recording medium of the present invention, it is possible to reliably obtain the reproducing signal with low noise, i.e., high S/N by the dichroic mirror and the color filter.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical recording medium comprising:
   a substrate;
   a light-emission layer; and
   a recording layer; wherein said light-emission layer is made of a light-emission material being excited by reproducing laser light to emit fluorescent light,
   said recording layer is made of a material in which at least a refractive index or an absorption coefficient relative to light emitted from said light-emission layer by recording laser light can be changed,
   said recording layer is disposed to be closer to a side into which said reproducing laser light is introduced than said light-emission layer, and
   recorded information recorded by the change of said refractive index or said absorption coefficient of said recording layer is read out from said light-emission layer with irradiation of said reproducing laser light as the change of intensity of emitted light.

2. An optical recording medium according to claim 1, wherein said light-emission layer is made of an organic fluorescent dye.

3. An optical recording medium according to claim 1, wherein said light-emission layer is made of a polymer in which an organic fluorescent dye is dispersed.

4. An optical recording medium according to claim 1, wherein said recording layer is formed of a write-once recording layer made of a photosensitive organic dye.

5. An optical recording medium according to claim 1, wherein said recording layer is formed of a rewritable recording layer made of a phase-change type recording material.

6. An optical recording medium according to claim 1, wherein said recording layer and said light-emission layer have a dielectric layer interposed therebetween.

7. An optical recording medium according to claim 1, wherein said recording layer and said light-emission layer are disposed between first and second reflecting films and a distance between said first and second reflecting films is selected to be less than at least a wavelength of said reproducing laser light or light emitted from said light-emission layer.

8. An optical recording medium according to claim 7, wherein at least said one reflecting film is made of a metal thin film or a dielectric multilayer reflecting film having a film thickness less than 50 nm.

9. An optical recording medium according to claim 1, wherein an laminated structure portion including said recording layer and said light-emission layer has on its light-emission layer laminated a reflecting film, and
   said light-emission layer has a thickness less than at least a wavelength of said reproducing laser light or light emitted from said light-emission layer.

10. An optical recording medium according to claim 1, wherein at least two or more laminated structure portions including said recording layer and said light-emission layer are stacked through an intermediate light transmittance layer made of a ultraviolet-curing resin layer or a polymer sheet.

11. An optical recording medium according to claim 1, wherein at least two or more laminated materials in which said laminated structure portion including said recording layer and said light-emission layer is disposed between first and second reflecting films are stacked through an intermediate light transmittance layer formed of a ultraviolet-curing resin layer or a polymer sheet.

12. An optical recording medium according to claim 11, wherein said reflecting film is made of a dielectric multilayer reflecting film.

13. An optical recording film according to claim 1, wherein said laminated structure portion including said light-emission layer and said recording layer has a light transmittance layer having a thickness of 10 $\mu$m to 177 $\mu$m formed thereon and said recording laser light and said reproducing laser light are irradiated from the side of said light transmittance layer.

14. An reproducing apparatus for an optical recording medium having a laminated structure portion including a light-emission layer and a recording layer, said light-emission layer being made of a light-emission material excited by reproducing laser light to emit fluorescent light, said recording layer being made of a material in which at least a refractive index or an absorption coefficient can be changed relative to light emitted from said light-emission layer by recording laser light, and said recording layer being disposed to be closer to a side into which said reproducing laser light is introduced than said light-emission layer, comprising:

a reproducing laser light source for exciting said light-emission layer; a polarizing beam splitter; a quarter-wave plate; a dichroic mirror; an objective lens; a pin-hole; and a photodetector for detecting light emitted from said light-emission layer, wherein said light-emission layer of said optical recording medium is excited by irradiating said reproducing laser light on said optical recording medium through said polarizing beam splitter, said quarter-wave plate, said dichroic mirror and said objective lens, detection light, which is generated by modulating light emitted by said excitation by recording information based on the change of said refractive index or said absorption coefficient of said recording layer, is separated from said reproducing laser light by said dichroic mirror, and recorded information is read out from said recording layer in a confocal detection fashion by said photodetector through said pin-hole 15. An recording and reproducing apparatus for an optical recording medium having a laminated structure portion including a light-emission layer and a recording layer, said light-emission layer being made of a light-emission material excited by reproducing laser light to emit fluorescent light, said recording layer being made of a material in which at least a refractive index or an absorption coefficient can be changed relative to light emitted from said light-emission layer by recording laser light, and said recording layer being disposed to be closer to a side into which said reproducing laser light is introduced than said light-emission layer, comprising:

a laser light source for generating laser light which serves as said recording laser light and said reproducing laser light relative to said recording layer; a polarizing beam splitter; a quarter-wave plate; a dichroic mirror; an objective lens; a pin-hole; and a photodetector for detecting light emitted from said light-emission layer, wherein laser light having a required recording power which is modulated in response to recording information is irradiated on said optical recording medium from said laser light source through said polarizing beam splitter, said quarter-wave plate, said dichroic mirror, and said objective lens to record information on said recording layer of said optical recording medium, said light-emission layer of said optical recording medium is excited by irradiating reproducing laser light having a power lower than said recording power on said optical recording medium from said laser light source through said polarizing beam splitter, said quarter-wave plate, said dichroic mirror and said objective lens, detection light, which is generated by modulating light emitted by said excitation by recording information based on the change of said refractive index or said absorption coefficient of said recording layer, is separated from said reproducing laser light by said dichroic mirror, and recorded information is read out from said recording layer by said photodetector through said pin-hole.

* * * * *